US012810326B1

(12) United States Patent
Ruskin

(10) Patent No.: US 12,810,326 B1
(45) Date of Patent: Nov. 24, 2026

(54) VEHICLE MAINTENANCE SYSTEM INCLUDING CONNECTED CAR DEVICE BASED PROMOTION AND RELATED METHODS

(71) Applicant: Inmar Clearing, Inc., Winston-Salem, NC (US)

(72) Inventor: Grazia Ruskin, Austin, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 152 days.

(21) Appl. No.: 18/243,590

(22) Filed: Sep. 7, 2023

(51) Int. Cl.
*G06Q 30/0251* (2023.01)
*G06Q 10/20* (2023.01)
*G07C 5/00* (2006.01)

(52) U.S. Cl.
CPC ......... *G06Q 30/0266* (2013.01); *G06Q 10/20* (2013.01); *G07C 5/006* (2013.01); *G07C 5/008* (2013.01)

(58) Field of Classification Search
CPC .... G06Q 30/0266; G06Q 10/20; G07C 5/006; G07C 5/008
USPC ......... 705/14.63; 370/329; 701/2; 180/65.21
See application file for complete search history.

(56) References Cited

U.S. PATENT DOCUMENTS 10,318,963 B1 * 6/2019 Prasad ................. G06Q 30/018
10,530,877 B2 1/2020 Maccini et al.
10,802,575 B2 * 10/2020 Schlecht ................. G06F 3/011
2011/0168463 A1 * 7/2011 Perkins ................ B60H 3/0071 180/65.21
2013/0311002 A1 * 11/2013 Isaac ...................... G07C 5/008 701/2
2018/0181997 A1 * 6/2018 Sanjeevaiah Krishnaiah ............. H04L 67/53
2019/0121628 A1 * 4/2019 Hu ........................ H04L 67/306
2020/0234515 A1 * 7/2020 Gronsbell .............. G06Q 40/08
2020/0273345 A1 * 8/2020 Mangal .................. G06Q 50/40
2021/0262811 A1 * 8/2021 Zellner .............. G01C 21/3492
2022/0108341 A1 * 4/2022 Zoto .................. G06Q 30/0222
2023/0138858 A1 * 5/2023 Bhardwaj ............... H04L 67/12 370/329
2024/0354808 A1 * 10/2024 Negley, III ........ G06Q 30/0241

OTHER PUBLICATIONS

CarCovers, The Role of Technology in Car Maintenance Apps and Tools You Should Know About, 2017 (Year: 2017).*
Ford Motor Company; "Sync Technology;" https://www.ford.com/technology/sync/; 11 pages; 2025.

* cited by examiner

*Primary Examiner* — Tarek Elchanti
(74) *Attorney, Agent, or Firm* — ALLEN, DYER, DOPPELT, + GILCHRIST, P.A.

(57) ABSTRACT

A vehicle maintenance system may include a connected car device configured to be positioned in a vehicle, obtain a vehicle maintenance-needed indication from the vehicle, and permit control of at least one application on a mobile wireless communications device. The vehicle maintenance system may also include a vehicle maintenance promotion server configured to communicate with the connected car device to determine the vehicle maintenance-needed indication, and generate a digital promotion based upon the vehicle maintenance-needed indication. The vehicle maintenance promotion server may also be configured to communicate the digital promotion to the connected car device.

17 Claims, 10 Drawing Sheets

VEHICLE MAINTENANCE SYSTEM INCLUDING CONNECTED CAR DEVICE BASED PROMOTION AND RELATED METHODS

TECHNICAL FIELD

The present application relates to vehicular electronics, and, more particularly, to vehicular maintenance systems, and related methods.

BACKGROUND

A vehicle typically provides an indication of a needed maintenance operation. For example, when maintenance is needed a visual indicator is often displayed within the field of view of the driver.

A vehicle that can receive and transmit data communications outside of the vehicle may be considered a connected car or as having a connected car device. A connected car, for example, may permit sharing of network access and vehicular data with other device, for example, both inside and outside the vehicle. One type of connected car system permits a mobile wireless communications device to operate based upon communications with the connected car system. For example, the mobile wireless communications device may be controlled or operated via the connected car device.

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

SUMMARY

A vehicle maintenance system may include a connected car device configured to be positioned in a vehicle, obtain a vehicle maintenance-needed indication from the vehicle, and permit control of at least one application on a mobile wireless communications device. The vehicle maintenance system may also include a vehicle maintenance promotion server configured to communicate with the connected car device to determine the vehicle maintenance-needed indication, and generate a digital promotion based upon the vehicle maintenance-needed indication. The vehicle maintenance promotion server may also be configured to communicate the digital promotion to the connected car device.

The vehicle maintenance promotion server may be configured to communicate the digital promotion to the connected car device for display thereat via the mobile wireless communications device. The connected car device may include connected car wireless communications circuitry, and the vehicle maintenance promotion server may be configured to communicate the digital promotion to the connected car device for display thereat via the connected car wireless communications circuitry, for example.

The vehicle maintenance promotion server may be configured to communicate with the connected car device based upon a transmission of the vehicle being in a park position, for example.

The vehicle may have a geographic position determining device. The vehicle maintenance promotion server may be configured to obtain a geographic position of the vehicle based upon the geographic position determining device and generate the digital promotion to be redeemable at a given maintenance facility based upon the geographic position of the vehicle, for example.

The mobile wireless communications device may include a mobile device geographic position determining device. The vehicle maintenance promotion server may be configured to obtain a geographic position of the vehicle based upon the mobile device geographic position determining device, and generate the digital promotion to be redeemable at a given maintenance facility based upon the geographic position of the mobile wireless communications device, for example.

The connected car device may include a head unit and a display coupled to the head unit. The display may include a touch-display, and the vehicle maintenance promotion server may be configured to save the digital promotion to a digital wallet associated with a user based upon input to the touch-display, for example.

The digital promotion may include a digital coupon redeemable toward needed maintenance associated with the vehicle maintenance-needed indication, for example. A user may have a user identifier associated therewith, and the vehicle maintenance promotion server may be configured to obtain the user identifier and generate the digital promotion based upon the user identifier.

The mobile wireless communications device may have a device identifier associated therewith. The vehicle maintenance promotion server may be configured to obtain the device identifier and generate the digital promotion based upon the device identifier, for example.

The vehicle may have a vehicle make and model associated therewith. The vehicle maintenance promotion server may be configured to generate the digital promotion based upon the make and model of the vehicle, for example.

A method aspect is directed to a method of processing a digital promotion for needed maintenance for a vehicle. The method may include operating a vehicle maintenance promotion server to communicate with a connected car device to determine a vehicle maintenance-needed indication. The connected car device may be configured to be positioned in the vehicle, obtain the vehicle maintenance-needed indication from the vehicle, and permit control of at least one application on a mobile wireless communications device. The vehicle maintenance promotion server may be operated to generate a digital promotion based upon the vehicle maintenance-needed indication, and communicate the digital promotion to the connected car device.

A computer readable medium aspect is directed to a non-transitory computer readable medium for processing a digital promotion for needed maintenance for a vehicle. The non-transitory computer readable medium includes computer executable instructions that when executed by a processor cause the processor to perform operations. The operations may include communicating with a connected car device to determine a vehicle maintenance-needed indication. The connected car device may be configured to be positioned in a vehicle, obtain the vehicle maintenance-needed indication from the vehicle, and permit control of at least one application on a mobile wireless communications device. The operations may further include generating a digital promotion based upon the vehicle maintenance-needed indication and communicating the digital promotion to the connected car device.

DETAILED DESCRIPTION

Figure 1:
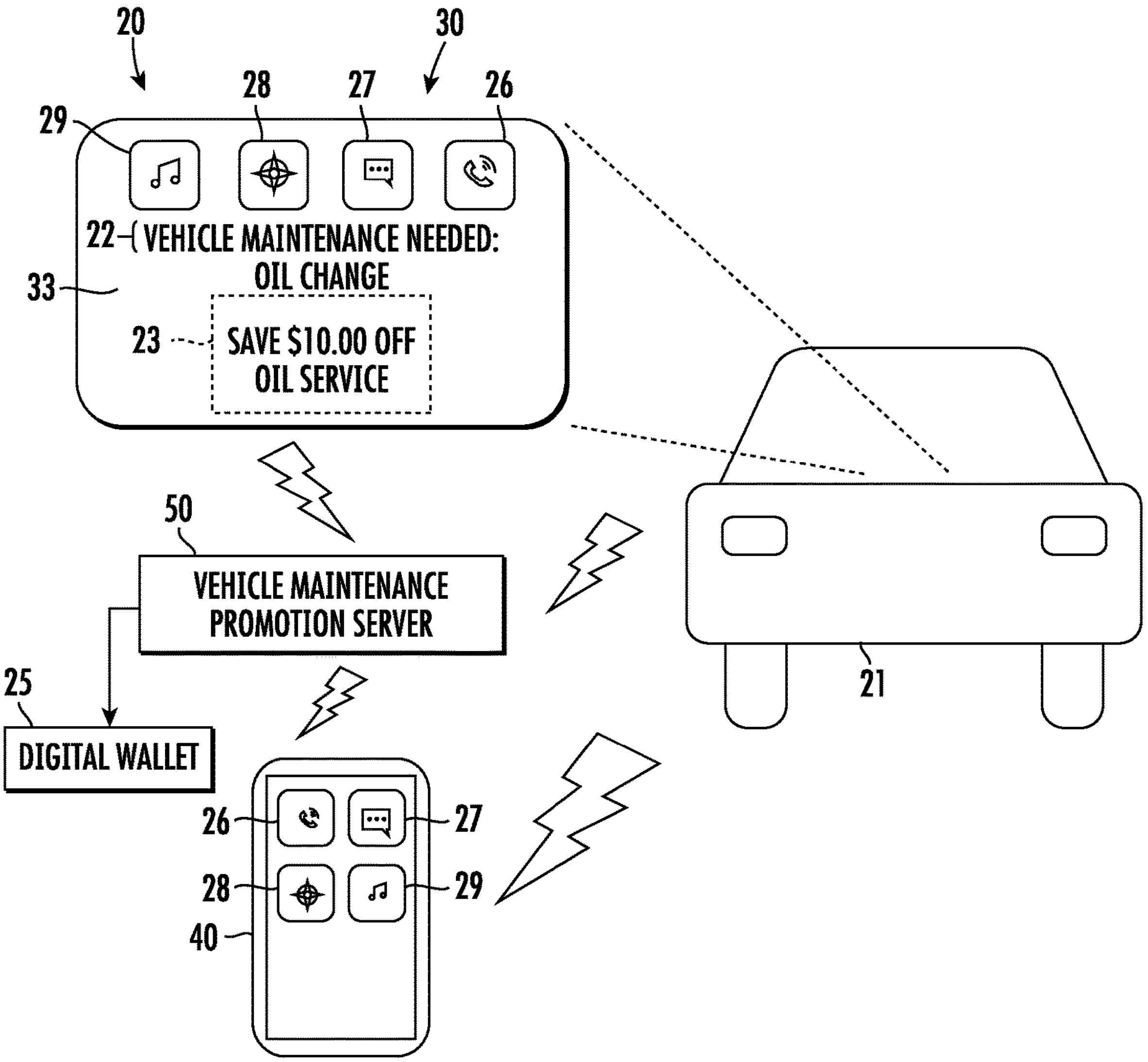
FIG. 1 is a schematic diagram of a vehicle maintenance system in accordance with an embodiment.
Figure 2:
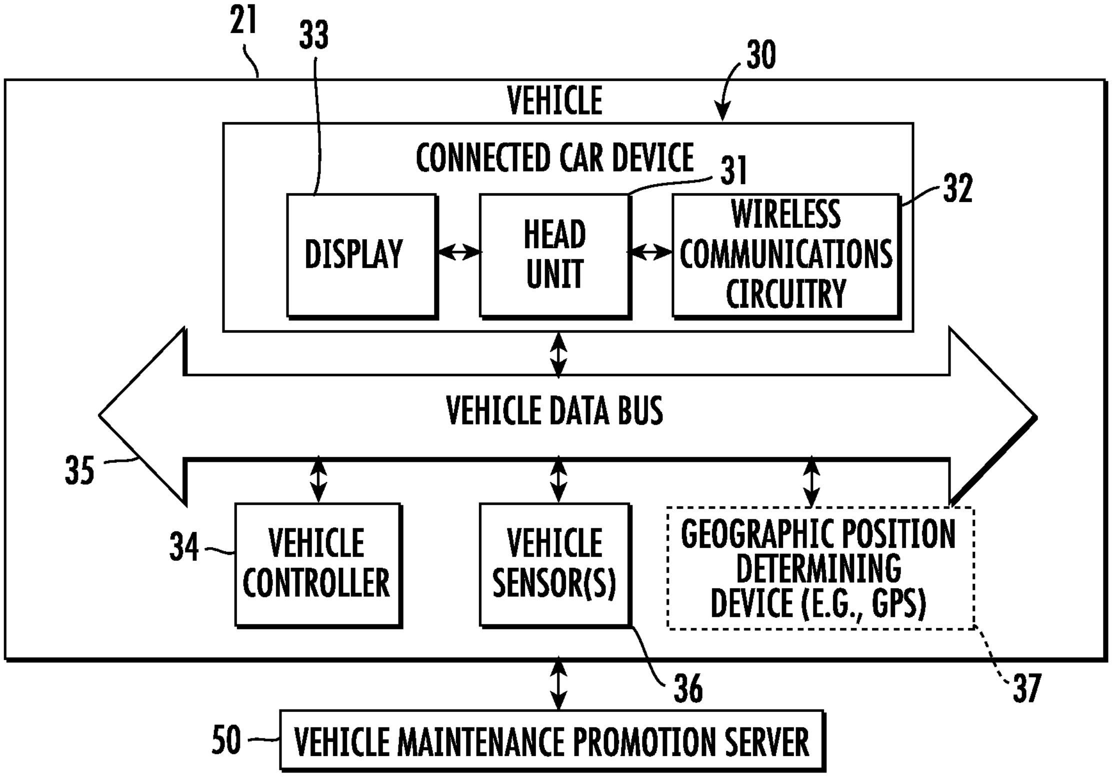
FIG. 2 is a schematic block diagram of a portion of the vehicle maintenance system of FIG. 1.
Figure 3:
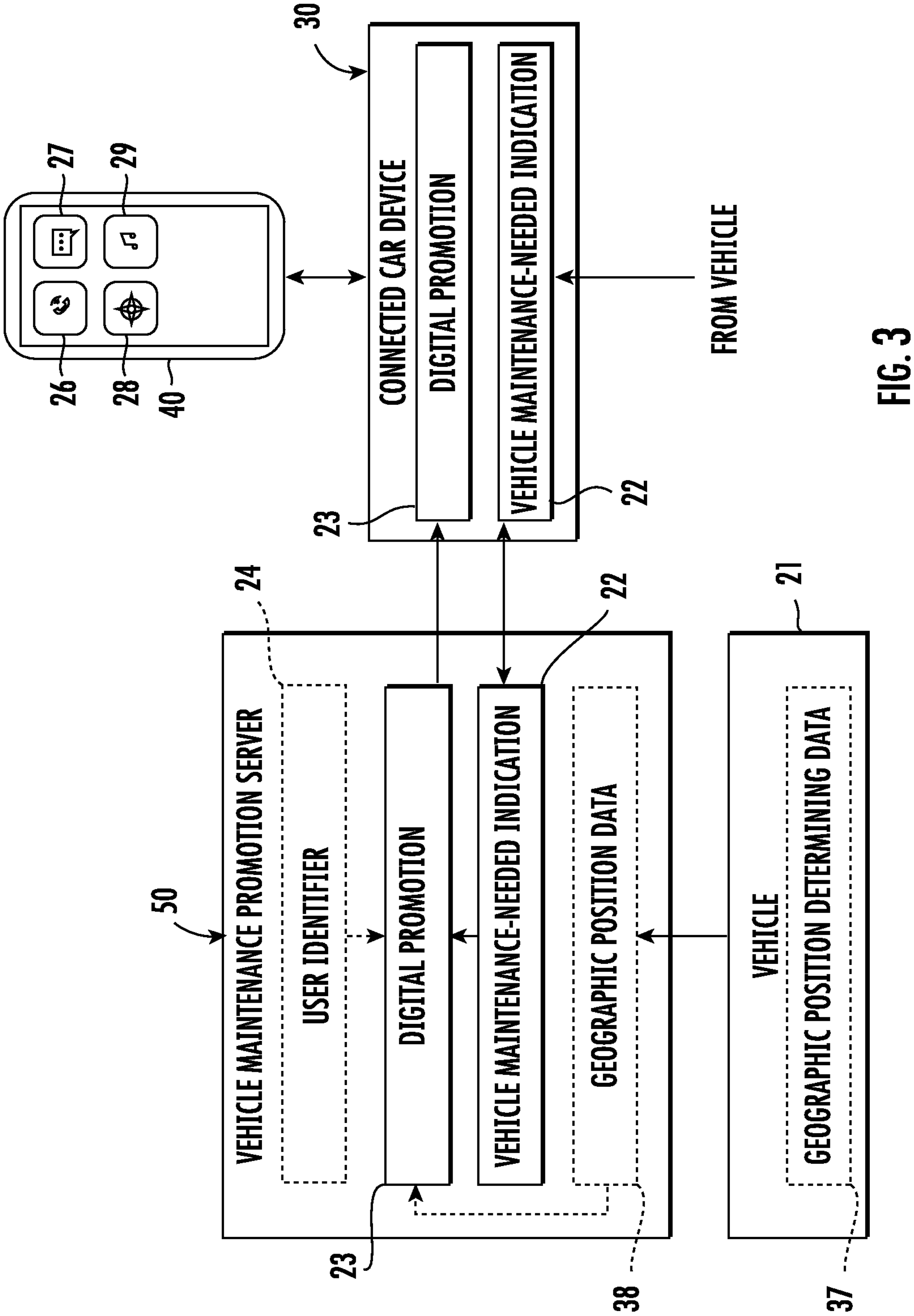
FIG. 3 is a schematic operational diagram of the vehicle maintenance system of FIG. 1.
Figure 4:
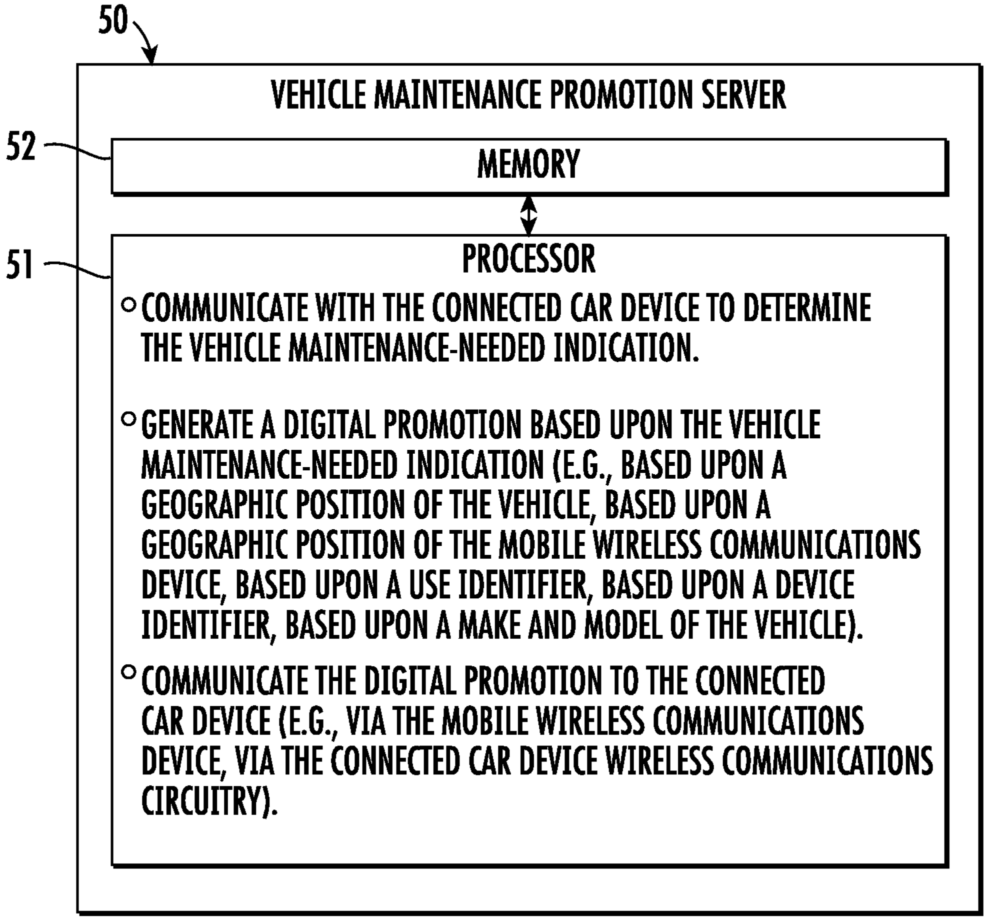
FIG. 4 is a schematic block diagram of the vehicle maintenance promotion server of the vehicle maintenance system of FIG. 1.

The present invention will now be described more fully hereinafter with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Referring initially to FIGS. 1-4, a vehicle maintenance system 20 for a vehicle 21 of a given make and model may include a connected car device 30. The connected car device 30 is positioned in the vehicle 21 and may include a head unit 31, wireless communications circuitry 32 coupled to the head unit, and a display 33 also coupled to the head unit. The display 33 may be a touch display, for example. The wireless communications circuitry 32 may include short-range communications circuitry (e.g. Bluetooth) for pairing and communicating with a mobile wireless communications device, WiFi communications circuitry, and/or cellular communications circuitry.

The connected car device 30 obtains a vehicle maintenance-needed indication 22 from the vehicle 21, as will be described in further detail below. The connected car device 30 may also permit control of at least one application on a mobile wireless communications device 40 associated with a user, for example, via the wireless communications circuitry 32 of the connected car device (e.g., Bluetooth paired communication between the connected car device and the mobile wireless communications device).

As will be appreciated by those skilled in the art, the connected car device 30 permits the head unit 31 and the display 33 to be a controller for the mobile wireless communications device 40. More particularly, the connected car device 30 controls applications on the mobile wireless communications device 40, such as, for example, phone applications 26, messaging applications 27, map applications 28, food ordering applications, and music and audiobook applications 29. Of course, other and/or additional applications may be controlled.

A vehicle controller 34 may be coupled to the display 33, for example, via the vehicle data bus 35. The vehicle controller 34 may be coupled to vehicle monitoring systems or vehicle sensors 36, for example, oil sensors, tire pressure sensors, fluid level sensors, tire tread sensors, etc., via a vehicle data bus 35. The connected car device 30 may also be coupled to the vehicle data bus 35. The vehicle controller 34 may cooperate with the various vehicle sensors 36 to sense various conditions associated with the respective vehicle sensors. The status of the vehicle sensors 36 may be displayed on the display 33. The connected car device 30 may cooperate with the vehicle controller 34, for example, to obtain a vehicle maintenance-needed indication 22 from the vehicle 21, and more particularly, from the vehicle controller 34 and the vehicle sensors 36.

The vehicle maintenance system 20 also includes a vehicle maintenance promotion server 50. The vehicle maintenance promotion server 50 includes a processor 51 and an associated memory 52. While operations of the vehicle maintenance promotion server 50 are described herein, those skilled in the art will be appreciate that the processor 51 and the memory 52 cooperate to perform the operations.

Figure 5:
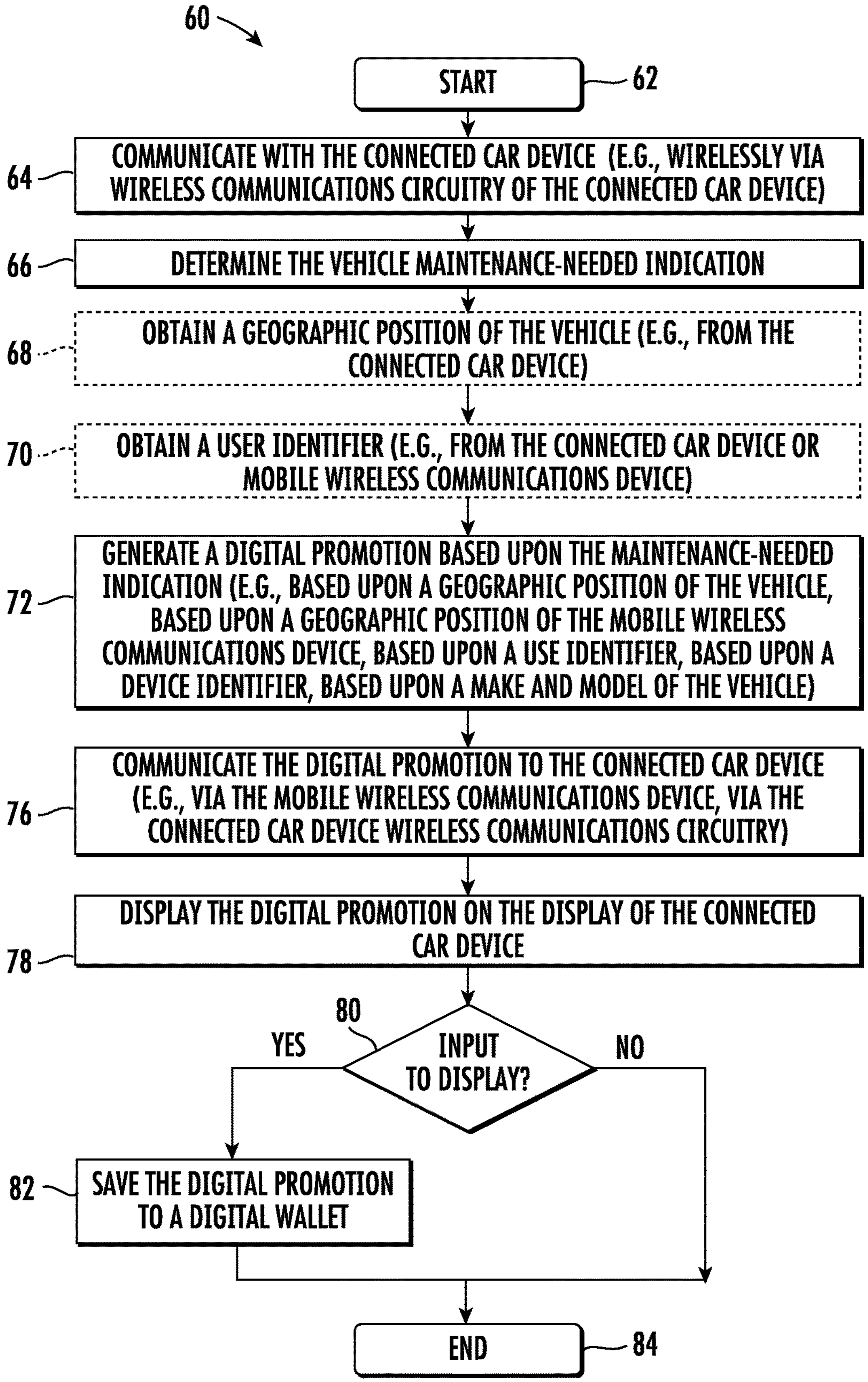
FIG. 5 is a flow diagram of operation of the vehicle maintenance promotion server of the vehicle maintenance system of FIG. 1.

Referring now to the flowchart 60 in FIG. 5, beginning at Block 62, operations of the vehicle maintenance promotion server 50 will now be described. The vehicle maintenance promotion server 50 communicates with the connected car device 30 to determine the vehicle maintenance-needed indication 22. The vehicle maintenance promotion server 50 may communicate, for example, wirelessly, with the connected car device 30 via the wireless communications circuitry 32 including cellular or other long-range communications circuitry (Block 64), to determine the vehicle maintenance-needed indication 22 (Block 66).

The vehicle maintenance promotion server 50 may obtain or receive raw data from the vehicle sensors 36 and process this data to determine the vehicle maintenance-needed indication 22, for example, by comparing the data to known thresholds for the make and model of the vehicle 21. In other embodiments, the vehicle maintenance promotion server 50 may obtain or receive data indicative of needed maintenance, for example, a data flag which may be decoded by the server to determine the vehicle maintenance-needed indication 22. The vehicle maintenance needed indication 22 may be displayed on the display 33. The vehicle needed maintenance indication 22 may be determined, in some embodiments, based upon data communicated from the connected car device 30 via the mobile wireless communications device 40. In other words, the mobile wireless communications device 40 may operate as a communications relay between the connected car device 30 and the vehicle maintenance promotion server 50.

The vehicle maintenance promotion server 50 generates a digital promotion 23 based upon the maintenance-needed indication 22 (Block 72). More particularly, the vehicle maintenance promotion server 50 may poll data communicated with the connected car device 30 to determine the maintenance-needed indication 22 has been determined (Block 66), and when the maintenance-needed indication has been determined, the vehicle maintenance promotion server generates the digital promotion 23 (Block 72).

The vehicle maintenance promotion server 50 may generate the digital promotion 23 to be in the form of a digital coupon redeemable toward a product or service associated with the maintenance-needed indication 22. For example, if the maintenance-needed indication 22 corresponds to needed changing of the vehicle's oil (e.g., based upon a timer and/or oil sensor), the digital coupon 23 may be redeemable toward an oil change service (e.g., $10.00 OFF an Oil Service). In another exemplary embodiment, if the maintenance-needed indication 22 corresponds to needed tire replacement (e.g., based upon mileage, low pressure, low tread, etc.), the digital coupon 23 may be redeemable toward the purchase of one or more tires. While the digital promotion 23 is illustratively in the form of a digital coupon, in an embodiment, the digital promotion may be a digital rebate. Further details of generation of the digital promotion 23 will now be described.

The vehicle maintenance promotion server 50 may additionally generate the digital promotion 23 based upon a geographic location of the vehicle 21, and more particularly obtained geographic position (Block 68). For example, the vehicle 21 may include a geographic position determining device 37, for example, a global positioning system (GPS) receiver that may be coupled the vehicle data bus 35. The geographic position of the vehicle 21 (e.g., in terms of geographic position data 38 or digital coordinates) may be communicated to or obtained by the vehicle maintenance promotion server 50 (Block 68), for example, via the wireless communications circuitry 32. The vehicle maintenance promotion server 50 may process the geographic position (e.g., GPS coordinates) and compare them against locations of known maintenance facilities. Accordingly, the vehicle maintenance promotion server 50 may generate the digital promotion 23 to be redeemable toward a product and/or service associated with the maintenance-needed indication 22, but also to be redeemable at the closest maintenance facility.

Figure 6:
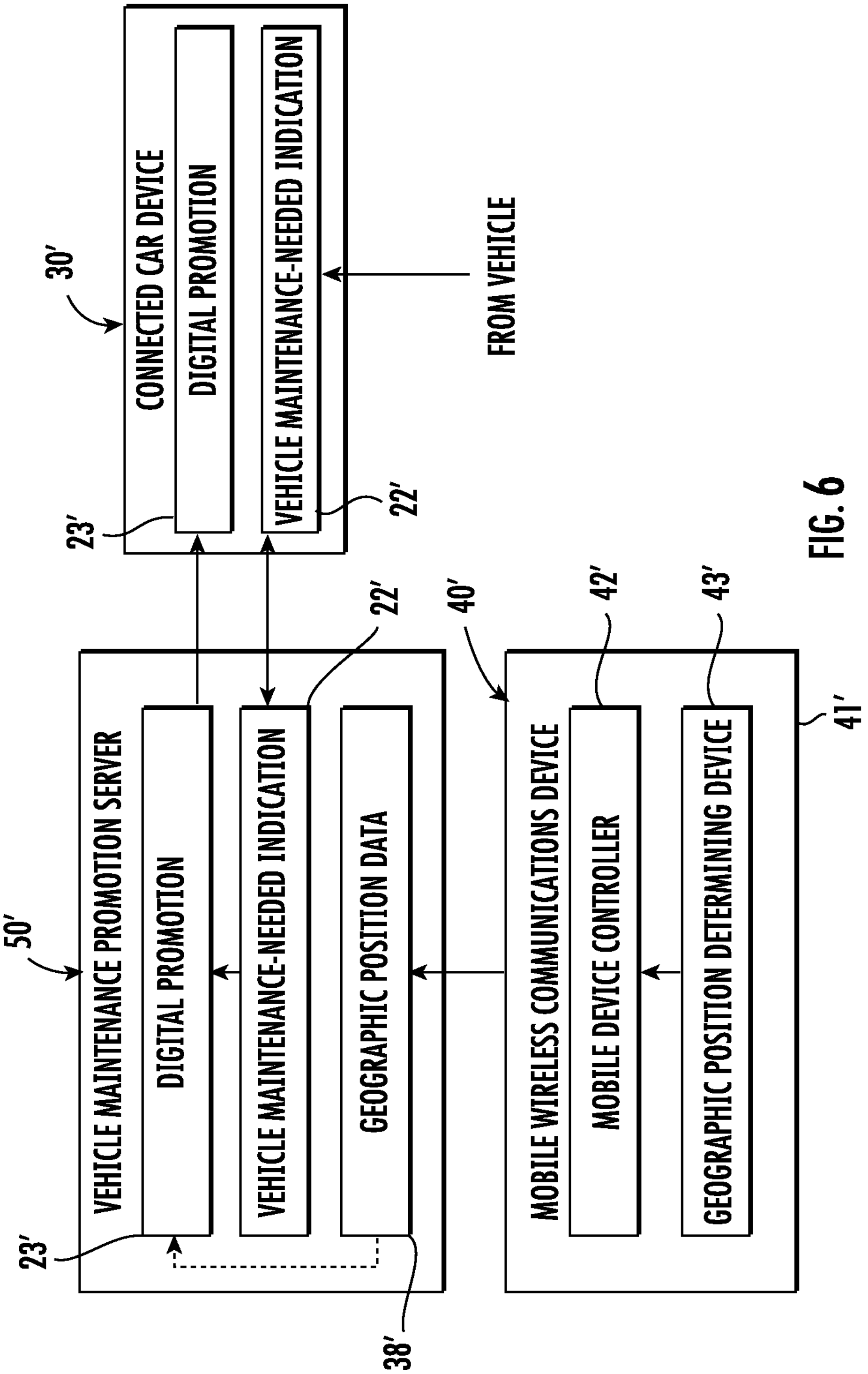
FIG. 6 is a schematic operational diagram of a vehicle maintenance system in accordance with another embodiment.

Referring briefly to FIG. 6, in another embodiment, the vehicle maintenance promotion server 50' may obtain geographic position data 38' (e.g., GPS data) from the mobile wireless communications device 40'. More particularly, the mobile wireless communications device 40' includes a portable housing 41' carrying a mobile device controller 42' and a mobile device geographic position determining device 43' coupled to the mobile device controller.

The vehicle maintenance promotion server 50' may obtain the geographic position data 38' from the mobile device geographic position determining device 43' and generate the digital promotion 23' based upon the geographic location of the mobile wireless communications device 40'. Accordingly, the vehicle maintenance promotion server 50' may generate the digital promotion 23' based upon the vehicle maintenance-needed indication 22' determined based upon communication with the connected car device 30' and to be redeemable toward a product and/or service associated with the maintenance-needed indication, but also to be redeemable at the closest maintenance facility based upon the geographic location of the mobile wireless communications device 40'.

Referring again to FIGS. 1-5, the vehicle maintenance promotion server 50 may alternatively or additionally generate the digital promotion 23 based upon a unique user identifier 24 associated with the user. More particularly, the vehicle maintenance promotion server 50 may obtain the user identifier 24 (Block 70) from the connected car device 30, for example, via the wireless communications circuitry 32. The user identifier 24 may be an email address, user identifier associated with one or more of the applications on the mobile wireless communications device, a phone number, or other unique identifier.

The vehicle maintenance promotion server 50 may, based upon the user identifier 24, obtain historical maintenance data for the user, such as, for example, favored maintenance facilities, home-based maintenance facility, maintenance intervals, price paid for a given maintenance, whether a promotion was used, and the make and model of associated vehicles. Thus, the vehicle maintenance promotion server 50 may generate the digital promotion 23 to be redeemable at a favorite or desired maintenance facility and/or for the given maintenance. In other words, each different needed maintenance may be associated with a different maintenance facility, and the digital promotion 23 may be generated based thereon.

In some embodiments, the vehicle maintenance promotion server 50 may generate the digital promotion 23 to have a redeemable value based upon any one or more of the needed maintenance, distance from the maintenance facility, and maintenance history, for example. In an exemplary implementation, the vehicle maintenance promotion server 50 may increase the redeemable value of the digital promotion 23 for the given user if a desired or selected maintenance facility is a larger distance for the given user as compared to other closer users. In another exemplary implementation, the maintenance promotion server 50 may increase the redeemable value of the digital promotion 23 for the given user if the given user more frequently visits a given maintenance facility as compared to other users who less frequently visit the given maintenance facility or visit several maintenance facilities.

The vehicle maintenance promotion server 50 may alternatively or additionally generate the digital promotion 23 based upon the make and model of the vehicle. For example, the digital promotion 23 may be generated to be redeemable at a Brand-X Dealership for a Brand-X Car. The vehicle maintenance promotion server 50 may generate the digital promotion 23 to be redeemable at a facility that may be a qualified seller or service center for the make and model of the vehicle 21. For example, if the given make and model of the vehicle 21 includes Brand-A Tires, the digital promotion 23 may be redeemable at a tire center that sells or is a qualified retailer for Brand-A Tires, which may not necessarily be the vehicle dealership for the make and model of the vehicle.

The vehicle maintenance promotion server 50 may alternatively or additionally generate the digital promotion 23 based upon a time of year or season. For example, the digital promotion 23 may be for a seasonal product or service corresponding to the needed maintenance. In a given implementation example, the needed maintenance may correspond to a coolant change, and the digital promotion 23 may be for a winter coolant. In another given implementation example, for example, where the needed maintenance is new tires, the digital promotion 23 may be for winter or snow tires when the time of year is fall or winter in a cold weather geographic location.

Figure 7:
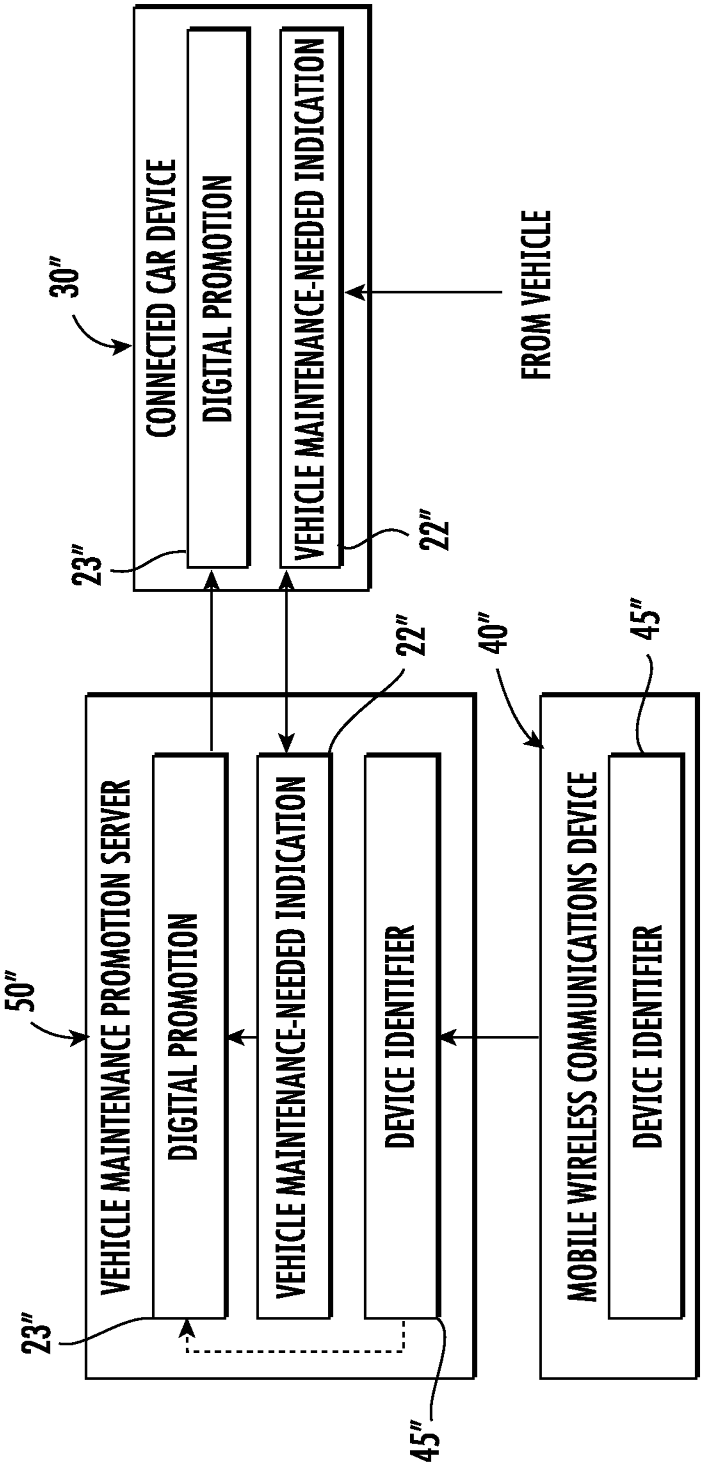
FIG. 7 is a schematic operational diagram of a vehicle maintenance system in accordance with another embodiment.

Referring briefly to FIG. 7, in another embodiment, the vehicle maintenance promotion server 50" may obtain a device identifier 45" associated with the mobile wireless communications device 40" (e.g., phone number, serial number, international mobile equipment identify (IMEI), etc.). The vehicle maintenance promotion server 50" may generate the digital promotion 23" based upon the vehicle maintenance-needed indication 22" communicated from the connected car device 30" based upon the device identifier 45", for example. Similarly to the user identifier, the device identifier 45" may be used to retrieve information about the user, such as, for example, favored maintenance facilities, home-based maintenance facility, maintenance intervals, price paid for a given maintenance, whether a promotion was used, the make and model of associated vehicles, and current and historical connected car devices (e.g. historical vehicular WiFi networks and/or Bluetooth vehicle device interfaces previously and/or currently provisioned and connected).

Referring again to FIGS. 1-5, the vehicle maintenance promotion server 50, at Block 76, communicates, for example, via the wireless communications circuitry 32, the digital promotion 23 to the connected car device 30 (e.g., directly to the connected car device without communicating the digital promotion via the mobile wireless communications device 40). In some embodiments, the vehicle maintenance promotion server 50 may communicate the digital promotion 23 to the connected car device 30 via the mobile wireless communications device 40. In other words, the vehicle maintenance promotion server 50 may wirelessly communicate the digital promotion 23 to the mobile wireless communications device 40 via mobile device wireless communications circuitry, which may, in turn, communicate, e.g., via Bluetooth or other short-range wireless communications protocol, the digital promotion to the connected car device 30 for display on the display 33.

The digital promotion 23 is displayed on the display 33 of the connected car device 30 (Block 78). The vehicle maintenance promotion server 50 may save the digital promotion 23 to a digital wallet 25 associated with the user. More particularly, the vehicle maintenance promotion server 50 may determine at Block 80 whether touch input has been provided to the display 33, for example, when the display is in the form of a touch display. Upon input by the user to the touch display 33, (Block 80), for example, touch input to the display corresponding to the display location of the digital promotion 23, the vehicle maintenance promotion server 50 may save the digital promotion to the digital wallet 25 for future redemption (Block 82). The digital wallet 25 may be identified for the given user based upon the obtained user identifier 24 and/or device identifier 45", as described above. Operations end at Block 84.

In some embodiments, a machine readable code, such as, for example, a QR code may be displayed on the display 33 either alongside or instead of the digital promotion 23. Capturing or scanning of the QR code by the mobile wireless communications device 40 may save the digital promotion 23 to the digital wallet 25. The product or service corresponding to the digital promotion 23 may be added to a list, such as, for example, a list of needed maintenance.

Figure 8:
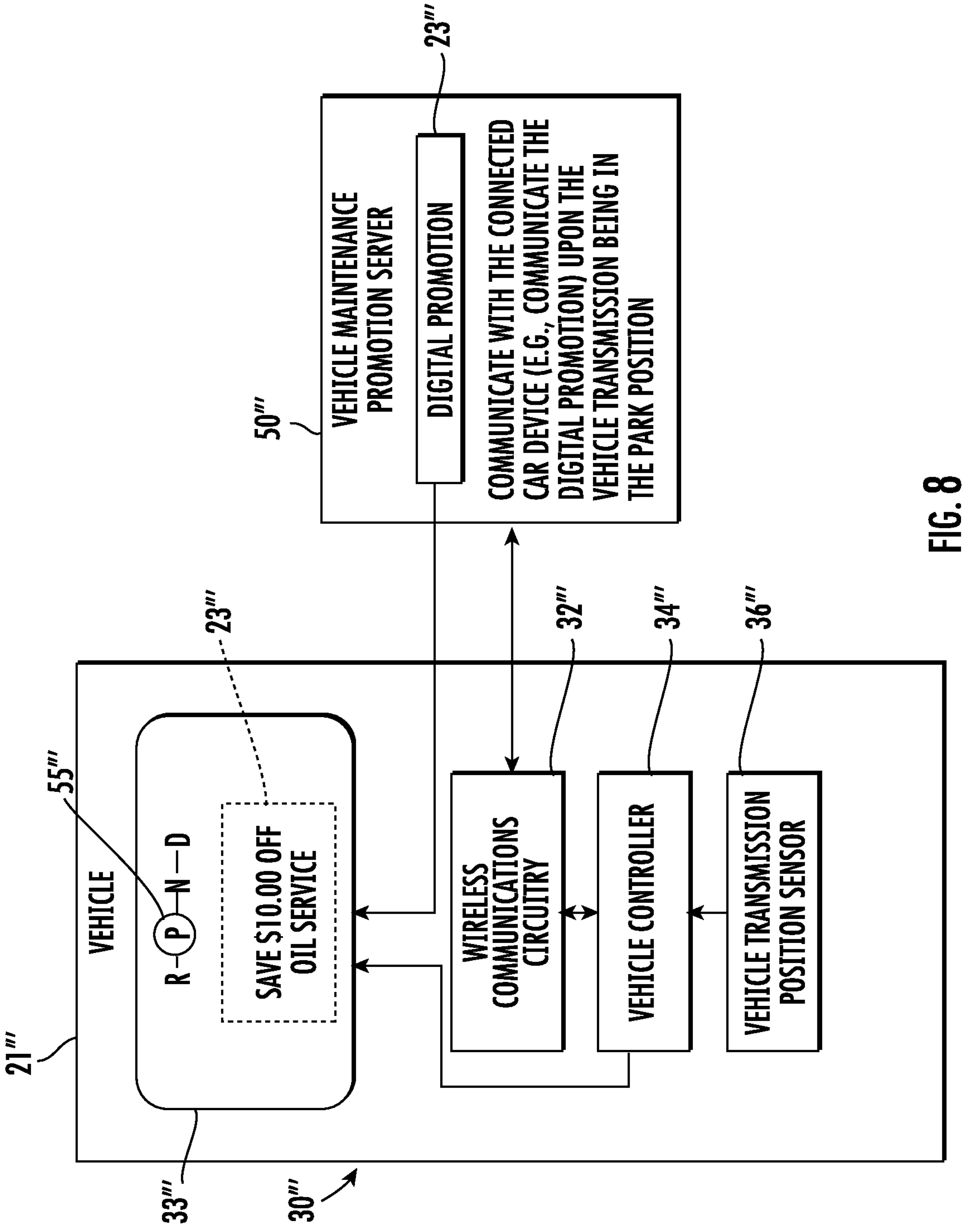
FIG. 8 is a schematic diagram of a vehicle maintenance system in accordance with another embodiment.
Figure 9A:
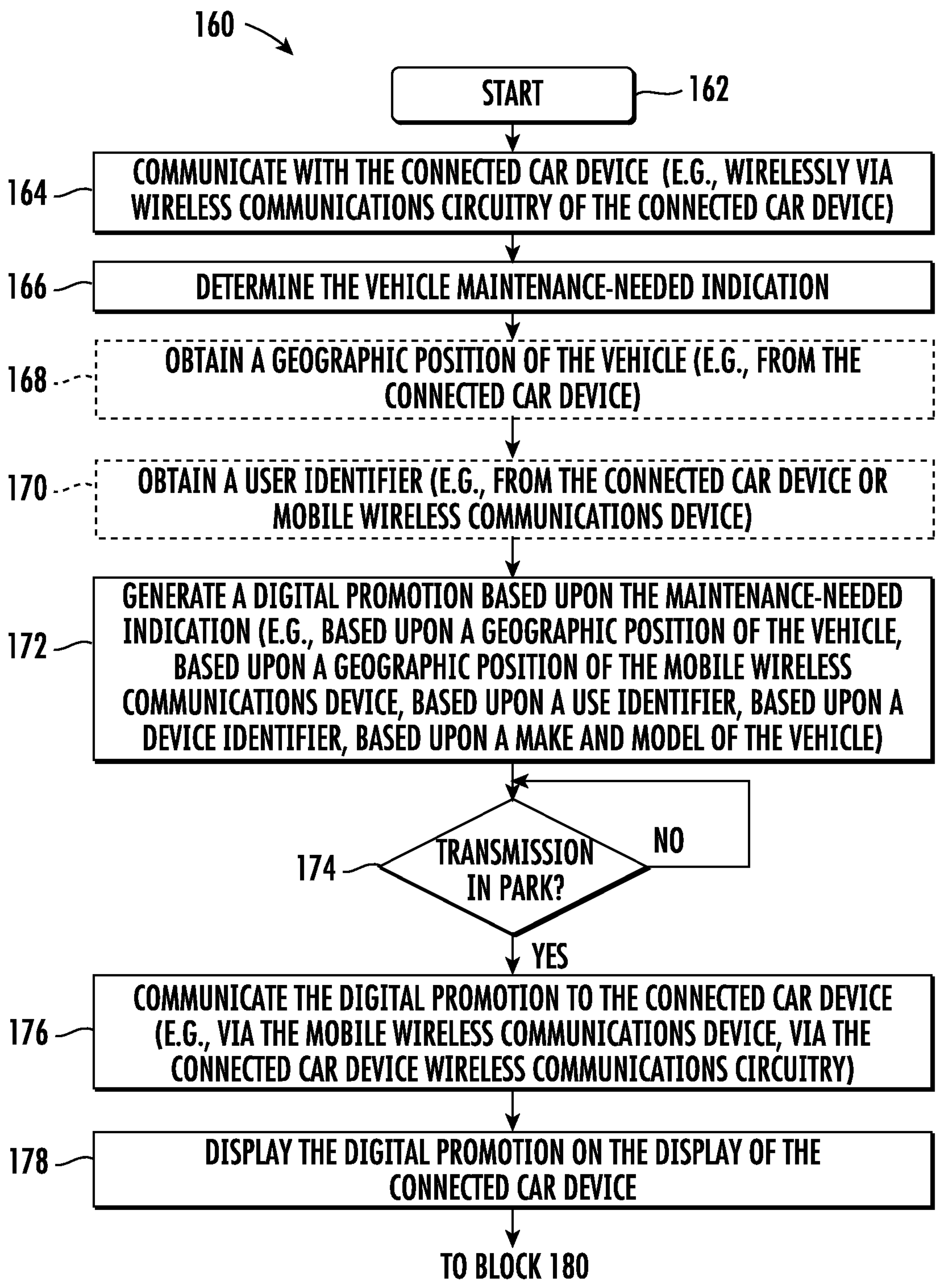
FIGS. 9A and 9B are flow diagrams of operation of a vehicle maintenance promotion server of a vehicle maintenance system in accordance with the embodiment of FIG. 8.
Figure 9B:
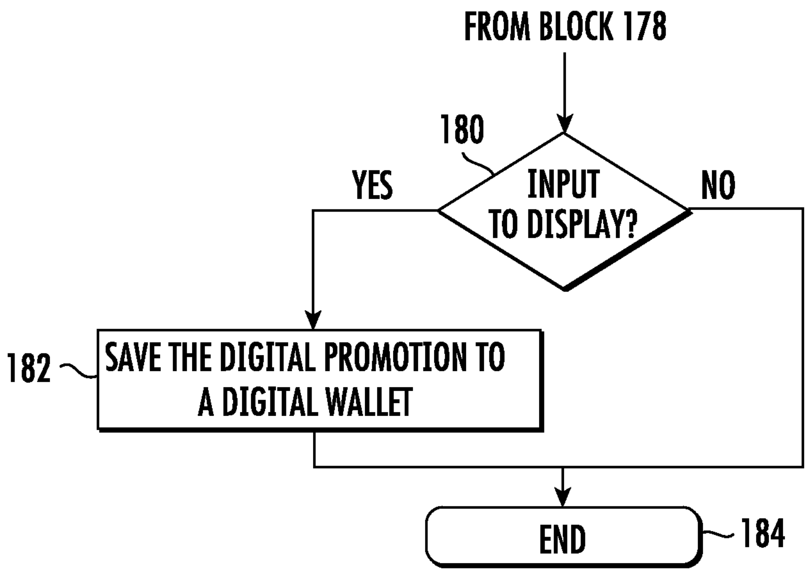

Referring now to FIG. 8 and the flowchart 160 in FIGS. 9A and 9B, beginning at Block 162, in another embodiment, the vehicle maintenance promotion server 50'", may determine whether a vehicle device is in a certain sensed condition. More particularly, in a given implementation example, the vehicle maintenance promotion server 50'" communicates with the vehicle controller 34'" (e.g., via the wireless communications circuitry 32'"), which cooperates with a vehicle transmission position sensor 36'" to determine when the transmission of the vehicle 21'" is in a park position (Block 174). When, at Block 174, the vehicle transmission is determined to be in the park position (the status 55'" of which may be indicated on the display 33'"), the vehicle maintenance promotion server 50'" communicates with the connected car device 30'", and more particularly, communicates the digital promotion 23'" to the connected car device for display on the display. In other words, the digital promotion 23'" is not displayed on the display 33'" until the vehicle has been put into the park position (i.e., not moving). Thus, the driver may be less distracted by the display of the digital promotion since driving will have been completed or the vehicle will no longer be driving or moving. Operations at Block 164-172 and 176-182 are similar to the operation described above at Blocks 64-72 and 76-82. Other and/or additional sensed conditions may serve as the basis for communicating the digital promotion 23'", for example, the vehicle 21'" be turned on, and/or the vehicle transmission be moved from drive to park. Operations end at Block 184.

A method aspect is directed to a method of processing a digital promotion 23 for needed maintenance for a vehicle 21. The method includes operating a vehicle maintenance promotion server 50 to communicate with a connected car device 30 to determine a vehicle maintenance-needed indication 22. The connected car device 30 is configured to be positioned in the vehicle 21, obtain the vehicle maintenance-needed indication 22 from the vehicle, and permit control of at least one application on a mobile wireless communications device 40. The vehicle maintenance promotion server 50 is operated to generate a digital promotion 23 based upon the vehicle maintenance-needed indication 22, and communicate the digital promotion to the connected car device 30.

A computer readable medium aspect is directed to a non-transitory computer readable medium for processing a digital promotion 23 for needed maintenance for a vehicle 21. The non-transitory computer readable medium includes computer executable instructions that when executed by a processor 51 cause the processor to perform operations. The operations include communicating with a connected car device 30 to determine a vehicle maintenance-needed indication 22. The connected car device 30 is configured to positioned in a vehicle 21, obtain the vehicle maintenance-needed indication 22 from the vehicle, and permit control of at least one application on a mobile wireless communications device 40. The operations further include generating a digital promotion 23 based upon the vehicle maintenance-needed indication 22 and communicating the digital promotion to the connected car device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A vehicle maintenance system comprising:
   a connected car device carried within a vehicle and coupled to a data bus of the vehicle, the connected car device comprising a head unit, wireless communications circuitry coupled to the head unit, and a display coupled to the head unit, the connected car device configured to obtain a vehicle maintenance-needed indication from the vehicle, and permit the head unit and the display to cooperate as a mobile device controller to control at least one application on a mobile wireless communications device via the wireless communications circuitry;

a vehicle controller coupled to the connected car device via the vehicle data bus and a plurality of vehicle sensors via the vehicle data bus, one of the plurality of vehicle sensors comprising a vehicle transmission position sensor, the vehicle controller configured to sense conditions associated with the plurality of vehicle sensors and communicate the sensed conditions with the connected car device for the vehicle maintenance-needed indication, and cooperate with the vehicle transmission position sensor to determine when a transmission of the vehicle is in a park position; and a vehicle maintenance promotion server configured to communicate with the connected car device, via the mobile wireless communications device, to determine the vehicle maintenance-needed indication, generate a digital promotion to be redeemable at a given maintenance facility based upon a geographic position determined by a geographic position determining device, the digital promotion being generated based upon the vehicle maintenance-needed indication, and communicate, based upon the transmission of the vehicle being in the park position, the digital promotion to the connected car device, via the mobile wireless communications device, for display on the display, and save the digital promotion to a digital wallet associated with a user.

2. The vehicle maintenance system of claim 1 wherein the vehicle has the geographic position determining device; and wherein the vehicle maintenance promotion server is configured to obtain the geographic position of the vehicle based upon the geographic position determining device and generate the digital promotion to be redeemable at the given maintenance facility based upon the geographic position of the vehicle.

3. The vehicle maintenance system of claim 1 wherein the mobile wireless communications device comprises the geographic position determining device; and wherein the vehicle maintenance promotion server is configured to obtain the geographic position of the vehicle based upon the geographic position determining device, and generate the digital promotion to be redeemable at the given maintenance facility based upon the geographic position of the mobile wireless communications device.

4. The vehicle maintenance system of claim 1 wherein the display comprises a touch-display; and wherein the vehicle maintenance promotion server is configured to save the digital promotion to the digital wallet associated with a user based upon input to the touch-display.

5. The vehicle maintenance system of claim 1 wherein the digital promotion comprises a digital coupon redeemable toward needed maintenance associated with the vehicle maintenance-needed indication.

6. The vehicle maintenance system of claim 1 wherein a user has a user identifier associated therewith; and wherein the vehicle maintenance promotion server is configured to obtain the user identifier and generate the digital promotion based upon the user identifier.

7. The vehicle maintenance system of claim 1 wherein the mobile wireless communications device has a device identifier associated therewith; and wherein the vehicle maintenance promotion server is configured to obtain the device identifier and generate the digital promotion based upon the device identifier.

8. The vehicle maintenance system of claim 1 wherein the vehicle has a vehicle make and model associated therewith; and wherein the vehicle maintenance promotion server is configured to generate the digital promotion based upon the make and model of the vehicle.

9. A vehicle maintenance promotion server comprising:

a processor and an associated memory configured to communicate with a connected car device, via a mobile wireless communications device, to determine a vehicle maintenance-needed indication, the connected car device carried within a vehicle and coupled to a data bus of the vehicle, the connected car device comprising a head unit, wireless communications circuitry coupled to the head unit, and a display coupled to the head unit, obtain the vehicle maintenance-needed indication from a vehicle controller coupled thereto via the vehicle data bus, the vehicle controller coupled to a plurality of vehicle sensors via the vehicle data bus, one of the plurality of vehicle sensors comprising a vehicle transmission position sensor, the vehicle controller and configured to sense conditions associated with the plurality of vehicle sensors and communicate the sensed conditions with the connected car device for the vehicle maintenance-needed indication and cooperate with the vehicle transmission position sensor to determine when a transmission of the vehicle is in a park position, permit the head unit and the display to cooperate as a mobile device controller to control at least one application on the mobile wireless communications device via the wireless communications circuitry, generate a digital promotion to be redeemable at a given maintenance facility based upon a geographic position determined by a geographic position determining device, the digital promotion being generated based upon the vehicle maintenance-needed indication, and communicate, based upon the transmission of the vehicle being in the park position, the digital promotion to the connected car device, via the mobile wireless communications device, for display on the display, and save the digital promotion to a digital wallet associated with a user.

10. The vehicle maintenance promotion server of claim 9 wherein the vehicle has the geographic position determining device; and wherein the processor is configured to obtain the geographic position of the vehicle based upon the geographic position determining device and generate the digital promotion to be redeemable at the given maintenance facility based upon the geographic position of the vehicle.

11. The vehicle maintenance promotion server of claim 9 wherein the mobile wireless communications device comprises the geographic position determining device; and wherein the processor is configured to obtain the geographic position of the vehicle based upon the geographic position determining device, and generate the digital promotion to be redeemable at the given maintenance facility based upon the geographic position of the mobile wireless communications device.

12. A method of processing a digital promotion for needed maintenance for a vehicle, the method comprising:

operating a vehicle maintenance promotion server to communicate with a connected car device, via a mobile wireless communications device, to determine a vehicle maintenance-needed indication, the connected car device carried within a vehicle and coupled to a data bus of the vehicle, the connected car device comprising a head unit, wireless communications circuitry coupled to the head unit, and a display coupled to the head unit, obtain the vehicle maintenance-needed indication from a vehicle controller coupled thereto via the vehicle data bus, the vehicle controller coupled to a plurality of vehicle sensors via the vehicle data bus, one of the plurality of vehicle sensors comprising a vehicle transmission position sensor, the vehicle controller and configured to sense conditions associated with the plurality of vehicle sensors and communicate the sensed conditions with the connected car device for the vehicle maintenance-needed indication and cooperate with the vehicle transmission position sensor to determine when a transmission of the vehicle is in a park position, permit the head unit and the display to cooperate as a mobile device controller to control at least one application on the mobile wireless communications device via the wireless communications circuitry, generate a digital promotion to be redeemable at a given maintenance facility based upon a geographic position of the vehicle determined by a geographic position determining device, the digital promotion being generated based upon the vehicle maintenance-needed indication, and communicate, based upon the transmission of the vehicle being in the park position, the digital promotion to the connected car device, via the mobile wireless communications device, for display on the display and save the digital promotion to a digital wallet associated with a user.

13. The method of claim 12 wherein the vehicle has the geographic position determining device; and wherein operating the vehicle maintenance promotion server comprises operating the vehicle maintenance promotion server to obtain the geographic position of the vehicle based upon the geographic position determining device and generate the digital promotion to be redeemable at the given maintenance facility based upon the geographic position of the vehicle.

14. The method of claim 12 wherein the mobile wireless communications device comprises the geographic position determining device; and wherein operating the vehicle maintenance promotion server comprises operating the vehicle maintenance promotion server to obtain the geographic position of the vehicle based upon the geographic position determining device, and generate the digital promotion to be redeemable at the given maintenance facility based upon the geographic position of the mobile wireless communications device.

15. A non-transitory computer readable medium for processing a digital promotion for needed maintenance for a vehicle, the non-transitory computer readable medium comprising computer executable instructions that when executed by a processor cause the processor to perform operations comprising:

communicating with a connected car device, via a mobile wireless communications device, to determine a vehicle maintenance-needed indication, the connected car device carried within a vehicle and coupled to a data bus of the vehicle, the connected car device comprising a head unit, wireless communications circuitry coupled to the head unit, and a display coupled to the head unit;

obtaining the vehicle maintenance-needed indication from a vehicle controller coupled thereto via the vehicle data bus, the vehicle controller coupled to a plurality of vehicle sensors via the vehicle data bus, one of the plurality of vehicle sensors comprising a vehicle transmission position sensor, the vehicle controller and configured to sense conditions associated with the plurality of vehicle sensors and communicate the sensed conditions with the connected car device for the vehicle maintenance-needed indication and cooperate with the vehicle transmission position sensor to determine when a transmission of the vehicle is in a park position; and permitting the head unit and the display to cooperate as a mobile device controller to control at least one application on the mobile wireless communications device via the wireless communications circuitry;

generating a digital promotion to be redeemable at a given maintenance facility based upon a geographic position of the vehicle determined by a geographic position determining device, the digital promotion being generated based upon the vehicle maintenance-needed indication; and communicating, based upon the transmission of the vehicle being in the park position, the digital promotion to the connected car device, via the mobile wireless communications device, for display on the display; and saving the digital promotion to a digital wallet associated with a user.

16. The non-transitory computer readable medium of claim 15 wherein the vehicle has the geographic position determining device; and wherein the operations comprise obtaining the geographic position of the vehicle based upon the geographic position determining device and generating the digital promotion to be redeemable at the given maintenance facility based upon the geographic position of the vehicle.

17. The non-transitory computer readable medium of claim 15 wherein the mobile wireless communications device comprises the geographic position determining device; and wherein the operations comprise obtaining the geographic position of the vehicle based upon the geographic position determining device, and generate the digital promotion to be redeemable at the given maintenance facility based upon the geographic position of the mobile wireless communications device.

* * * * *